United States Patent Office 3,032,591
Patented May 1, 1962

3,032,591
SUBSTITUTED CYCLOTETRAPHOSPHINES
William A. Henderson, Jr., Sheldon A. Buckler, and Martin Epstein, Stamford, Conn., assignors to American Cyanamid Company, New York, N.Y., a corporation of Maine
No Drawing. Filed June 5, 1961, Ser. No. 114,643
14 Claims. (Cl. 260—606.5)

This invention relates to novel organic phosphines. More particularly, the invention is concerned with tetraalkyl cyclotetraphosphines and has for its object the preparation of such cyclotetraphosphines.

The application is a continuation-in-part of copending application, Serial No. 49,149, filed on August 12, 1960, now abandoned.

The 4-membered cyclic phosphorous compounds of the present invention may be represented by the following formula:

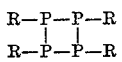

wherein each R is a straight-chain or branched-chain alkyl radical of from 3 to 12 carbon atoms, such as n-propyl, isopropyl, n-butyl, sec-butyl, n-pentyl, hexyl, n-octyl, n-nonyl, decyl, undecyl, dodecyl and isomers thereof. Advantageously, the compounds of the present invention may be prepared in a straight-forward manner. One such method involves the reaction between a primary alkylphosphine and a primary alkyldihalophosphine in the presence of an inert organic solvent, and thereafter recovering the corresponding cyclotetraphosphine. Thus, symmetrically tetraalkyl-substituted cyclotetraphosphines are prepared and recovered. Another method contemplates the treatment of a primary phosphine oxide by heating the latter in an inert atmosphere so as to effect ring closure. A third method contemplates the conversion of a primary alkyldihalophosphine by means of a reducing metal, such as lithium or magnesium, to recover a tetraalkylcyclotetraphosphine in good yield. In each of the aforementioned methods described above, the alkylphosphine reactant contains at least three and not more than about twelve carbon atoms.

Thus, the cyclic phosphorous compounds of the present invention may be prepared in accordance with the following alternative reactions:

[I]     

or

[II]    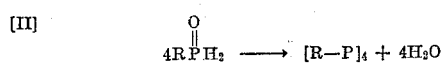

or

[III]   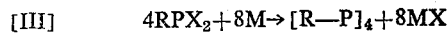

wherein each R has the same value as above, X represents a halo radical, such as chloro, bromo, iodo, or fluoro, and M is magnesium or an alkali metal, such as sodium, potassium or lithium.

In general, the phosphine oxides employed as reactants hereinabove are prepared by several procedures as set forth in copending applications for Letters Patent of S. A. Buckler et al., Serial Nos. 824,168, now U.S. Patent No. 3,005,029, and 824,169, both filed on July 1, 1959. For instance, in Serial No. 824,168, there are disclosed primary and secondary phosphine oxides prepared by reacting in the presence of a mineral acid a ketone and phosphine in equimolar proportions. Further, primary phosphine oxides have been prepared in Serial No. 824,169 by reacting a primary phosphine in the presence of an oxidizing agent and a polar solvent at a temperature of about 0° C.

In the above graphically illustrated reactions, suitable primary phosphines which are contemplated as containing from three to twelve carbon atoms are: n-propylphosphine, isopropylphosphine, isobutylphosphine, sec-butylphosphine, t-butylphosphine, 3-pentylphosphine, n-hexylphosphine, 2-heptylphosphine, n-octylphosphine, 2-decylphosphine, laurylphosphine, 3-dodecylphosphine, the corresponding homologs and isomers. Similarly, the corresponding dihalophosphines which can be advantageously employed include: n-propyldichloro-phosphine, isopropyldibromophosphine, sec-butyldichlorophosphine, 2-pentyldichlorophosphine, n-octyldichlorophosphine, dodecyldichlorophosphine, their homologs and isomers. It has been found that, where different alkyl phosphines are reacted, such as for instance n-octylphosphine and isobutylphosphine, a product is obtained which is identified only as a mixture of cyclotetraphosphines rather than as a single compound.

Illustrative primary phosphine oxides within the purview of the invention are: isopropylphosphine oxide, sec-butylphosphine oxide, 3-pentylphosphine oxide and n-octylphosphine oxide. The latter oxides can be prepared by reacting a corresponding ketone, as for example, cyclohexanone or acetone in an aqueous mineral acid, such as hydrochloric acid, and in the presence of gaseous phosphine. The corresponding primary phosphine oxide is then recovered. Alternatively, the primary phosphine oxides may be prepared by oxidizing a primary phosphine, such as 2-octylphosphine, in the presence of an alcohol or an equivalent polar solvent, such as for instance acetonitrile at a temperature of not more than about 0° C.

It is good practice to react equivalent amounts of the primary alkylphosphine and a dihaloalkylphosphine as indicated in Reaction [I] above, although a slight excess of one or the other reactant can be tolerated. Reaction takes place when the mixture is heated between about 25° C. and about 100° C. for from about one to ten hours to evolve a mineral acid which at elevated temperatures is eliminated as a gas. As is also indicated in Reaction [II] above, the primary phosphine oxide alone is heated at an elevated temperature of about 50° C. to about 100° C. and preferably from about 60° C. to about 80° C. and in the absence of a solvent for from about one hour to about ten hours to convert the phosphine oxide to a 4-membered cyclic phosphorous compound. In Reaction [III] above, the reduction of a dihalophosphine is slowly carried out at a temperature ranging from −80° C. to 100° C., and preferably from −40° C. to 25° C., usually for a contact time from about twenty to thirty hours, or until the reducing metal has completely reacted.

In general, no solvent is employed for Reaction [II] above. However, an inert organic solvent is advantageously employed when carrying out the hereinabove Reactions [I] and [III]. Exemplary solvents are: benzene, toluene, xylene, naphtha, hexane, ether, dioxane, tetrahydrofuran, dimethyl ether of diethylene glycol and equivalents thereof.

The following illustrative, non-limitative examples will serve to more fully describe the instant invention. Unless otherwise noted, the parts given are by weight.

EXAMPLE 1

Preparation of Tetra-3-Pentylcyclotetraphosphine

In a suitable closed vessel, equipped with means to supply heat and vacuum thereto, are added 36 parts of 3-pentylphosphine oxide. A vacuum of 1 mm. Hg pressure is then applied and the temperature gradually raised to 65° C. over a period of about three hours. The contents in the vessel are allowed to react for about ten hours and then removed from the reaction vessel. The resultant crystalline mass is recrystallized from petroleum ether to yield 6.2 parts of tetra-3-pentylcyclotetraphosphine as fine colorless needles having a melting point of from 92° C. to 93° C.

Analysis in percent: Calculated, C, 58.82; H, 10.85; P, 30.01. Found, C, 58.79; H, 10.52; P, 30.01.

Upon further analysis the molecular weight of said cyclotetraphosphine in benzene is 431. The ultra-violet spectrum further shows peaks at 208 M$\mu$, $\epsilon$ 16,800; 217 m$\mu$, $\epsilon$ 12,750; 235 m$\mu$, $\epsilon$ 5,325; 258 m$\mu$, $\epsilon$ 4,080; 289 m$\mu$, $\epsilon$ 4,850.

EXAMPLE 2

*Preparation of Tetra-n-Octylcyclotetraphosphine*

In a vessel equipped with a water-condenser and mercury-filled trap to exclude air are placed under nitrogen 1.60 parts of n-octyldichlorophosphine and 1.10 parts of n-octylphosphine in 5 parts of benzene. The solution is heated to 80° C., at which point hydrochloric acid is evolved. After evolution of gas has ceased, the solution is allowed to cool. Distillation yields 2.0 parts of tetra-n-octylcyclotetraphosphine.

Analysis in percent: Calculated, P, 21.48; C, 66.61; H, 11.89. Found, P, 21.33; C, 66.50; H, 11.90.

EXAMPLE 3

*Preparation of Tetraisobutylcyclotetraphosphine*

In a flat-bottom vessel equipped with an efficient stirrer are placed 8 parts of isobutyldichlorophosphine, 0.7 part of lithium ribbon and 50 parts (by volume) of dry tetrahydrofuran under a nitrogen atmosphere. The mixture is next stirred vigorously and refluxed for about four days. Solvent is then removed and the liquid material boiling from 145° C. to 148° C. at 1 mm. Hg pressure collected.

Analysis in percent: Calculated, C, 54.54; H, 10.30; P, 35.17. Found, C, 54.31; H, 10.43; P, 35.06.

EXAMPLE 4

*Preparation of Tetra-n-Propylcyclotetraphosphine*

In the same manner as for the preparation of tetra-3-pentylcyclotetraphosphine as in Example 1 above, 92 parts of n-propylphosphine oxide are converted to 30 parts of tetra-n-propylcyclotetraphosphine, characterized as possessing a boiling point equal to 120° C. to 124° C. at 1 mm. Hg pressure.

Analysis in percent is as follows: Calculated, C, 48.65; H, 9.46; P, 41.91. Found, C, 48.44; H, 9.54; P, 41.70.

EXAMPLE 5

*Preparation of 3-Pentylphosphine Oxide Intermediate*

A solution of 43 parts (0.50 mol) of 3-pentanone in 125 parts (by volume) of concentrated hydrochloric acid is reacted with phosphine for five hours. The resulting reaction mixture is then carefully neutralized with aqueous sodium hydroxide in a nitrogen atmosphere and the resulting solution extracted several times with methylene chloride. The extracts are combined, dried over sodium sulfate and the methylene chloride is removed by evaporation. Finally the 3-pentylphosphine oxide is obtained in good yield.

EXAMPLE 6

*Preparation of Octylphosphine Oxide Intermediate*

A solution of 14.6 grams (0.1 mole) of octylphosphine in 60 milliliters of alcohol is placed in a suitable apparatus. A solution of 11.3 grams (0.1 mole) of 30% aqueous hydrogen peroxide is added continuously to the primary phosphine solution at 0° C. in the course of 45 minutes. Resultant solution is evaporated in a nitrogen atmosphere at a reduced pressure to give octylphosphine oxide as a colorless liquid.

The phosphines of the instant invention find utility as polymerization accelerators for epoxy-type monomers for the preparation of epoxy resins. To demonstrate this utility, each of the cyclotetraphosphine compounds, prepared in accordance with Examples 1 through 4 above, is added in an amount equal to one percent by weight to the monomer, diglycidyl ether of isopropylidene diphenol, and the mixture so-prepared is heated for one hour at 170° C. After the expiration of one hour, the viscosity of each mixture is substantially higher than the aforementioned monomer when heated at 170° C. for as much as twelve hours without said phosphine derivative. These tests indicate rapid polymerization of epoxy-type monomers in the presence of the phosphine derivatives of the present invention.

In addition to the use of such compounds as polymerization accelerators, the phosphine derivatives may be incorporated in small amounts in motor fuels, such as gasoline, which contain tetraethyl lead, to suppress pre-ignition firing to a significant degree.

We claim:

1. As a new compound: a 4-membered, cyclic phosphorous compound of the general formula:

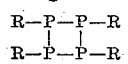

wherein each R is the same hydrocarbon radical of from three to twelve carbon atoms selected from the group consisting of straight-chain alkyl and branched-chain alkyl radicals.

2. As a new compound: Tetra-3-pentylcyclotetraphosphine.

3. As a new compound: Tetra-n-octylcyclotetraphosphine.

4. As a new compound: Tetraisobutylcyclotetraphosphine.

5. As a new compound: Tetra-n-propylcyclotetraphosphine.

6. A method for the preparation of the cyclic 4-membered phosphine compounds of the general formula:

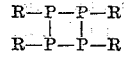

wherein each R is the same hydrocarbon radical containing from three to twelve carbon atoms selected from the group consisting of straight-chain alkyl and branched-chain alkyl radicals, which comprises: heating at a temperature of from about 50° C. to about 100° C. a primary phosphine oxide containing from three to twelve carbon atoms and being selected from the group consisting of straight-chain alkyl phosphine oxide and branched-chain alkyl phosphine oxide, and thereafter recovering so-formed cyclotetraphosphine compound.

7. A method for the preparation of tetra-3-pentylcyclotetraphosphine which comprises: heating a 3-pentylphosphine oxide at a temperature of about 65° C., and thereafter recovering so-formed tetra-3-pentylcyclotetraphosphine.

8. A method for the preparation of the cyclic 4-membered phosphine of the general formula:

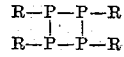

wherein each R is the same hydrocarbon radical from three to twelve carbon atoms and selected from the group consisting of straight-chain alkyl and branched-chain alkyl radicals, which comprises: reacting (1) a primary alkyl phosphine containing from three to twelve carbon atoms and selected from the group consisting of straight-chain alkyl and branched-chain alkyl radicals, and (2) a primary alkyl dihalophosphine containing from three to twelve carbon atoms corresponding to the alkyl group of the first mentioned reactant and selected from the group consisting of primary straight-chain alkyl dihalophosphine and primary branched-chain alkyl dihalophosphine in substantially equivalent amounts and in the presence of an inert solvent at a temperature of from about 25° C. to about 100° C., and recovering so-formed cyclotetraphosphine compound.

9. A process according to claim 8, in which the primary alkyl phosphine is n-octylphosphine and the primary alkyl dihalophosphine is n-octyldichlorophosphine.

10. A process according to claim 8, in which the primary alkyl phosphine is isobutylphosphine and the primary alkyl dihalophosphine is isobutyldichlorophosphine.

11. A process according to claim 8, in which the primary alkyl phosphine is n-propylphosphine and the primary alkyl dihalophosphine is n-propyldichlorophosphine.

12. A process for the preparation of a cyclic 4-membered phosphine of the general formula:

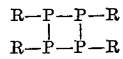

wherein R is a hydrocarbon radical from three to twelve carbon atoms and selected from the group consisting of straight-chain alkyl and branched-chain alkyl radicals, which comprises: reacting at a temperature of from about −80° C. to about 100° C. for from about twenty hours to about thirty hours one mol of a primary alkyl dihalophosphine with about two mols of a reducing metal selected from the group consisting of an alkali metal and magnesium, and thereafter recovering the so-formed cyclotetraphosphine.

13. A process according to claim 12, wherein the reducing metal is lithium and the primary alkyl dihalophosphine is isobutyldichlorophosphine.

14. A process according to claim 12, wherein the reducing metal is magnesium and the primary alkyl dihalophosphine is propyldichlorophosphine.

No references cited.